UNITED STATES PATENT OFFICE.

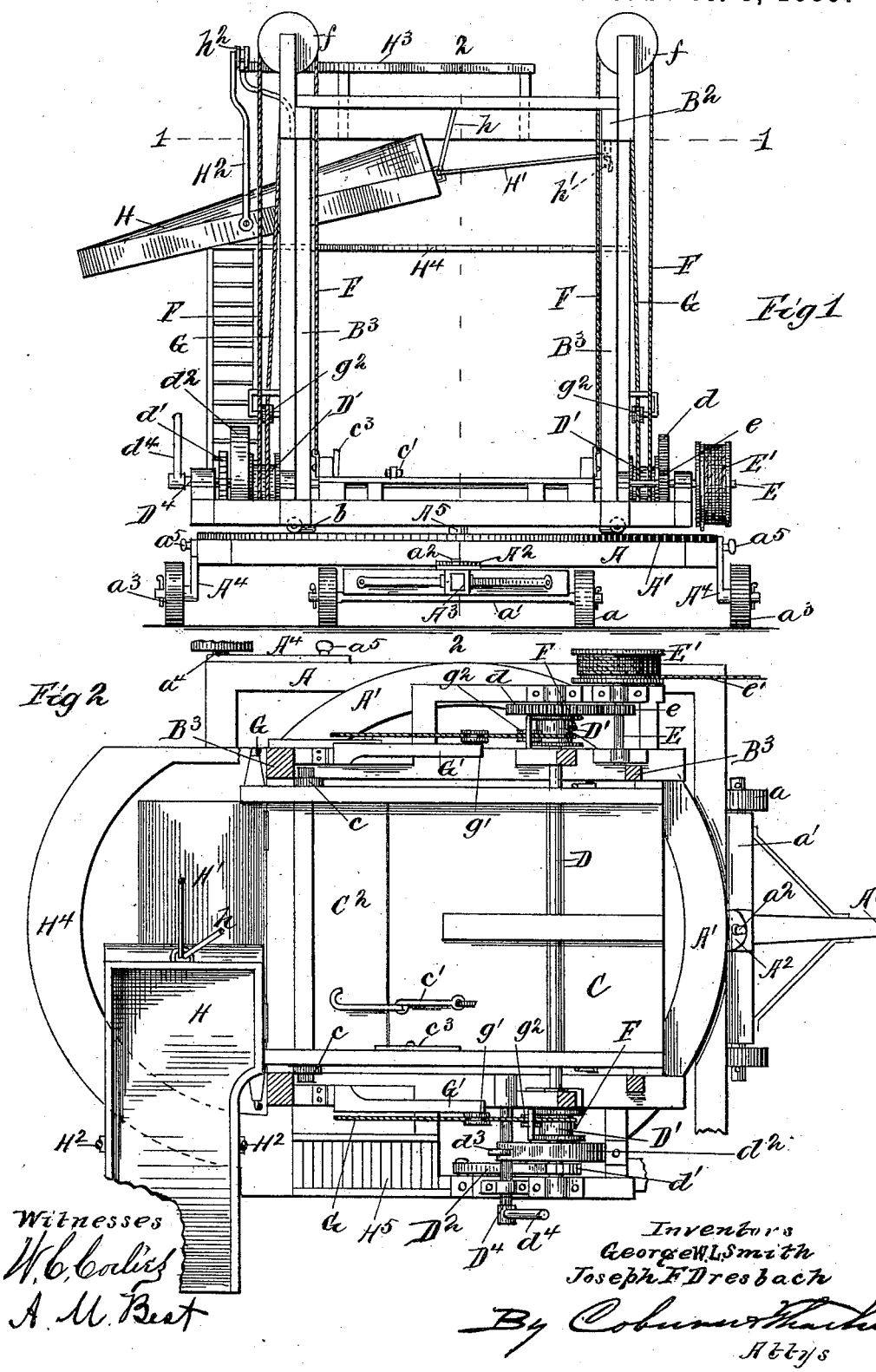

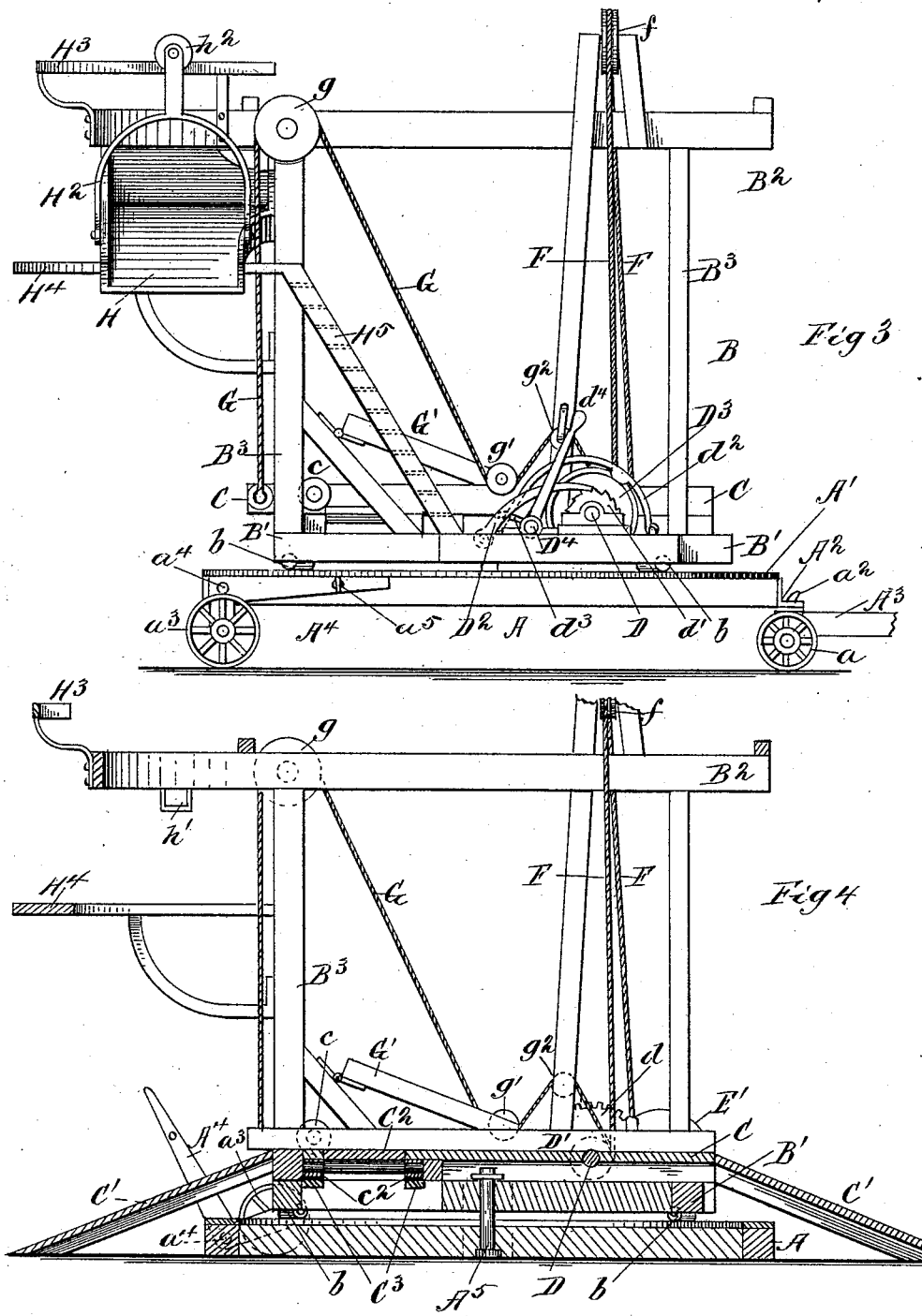

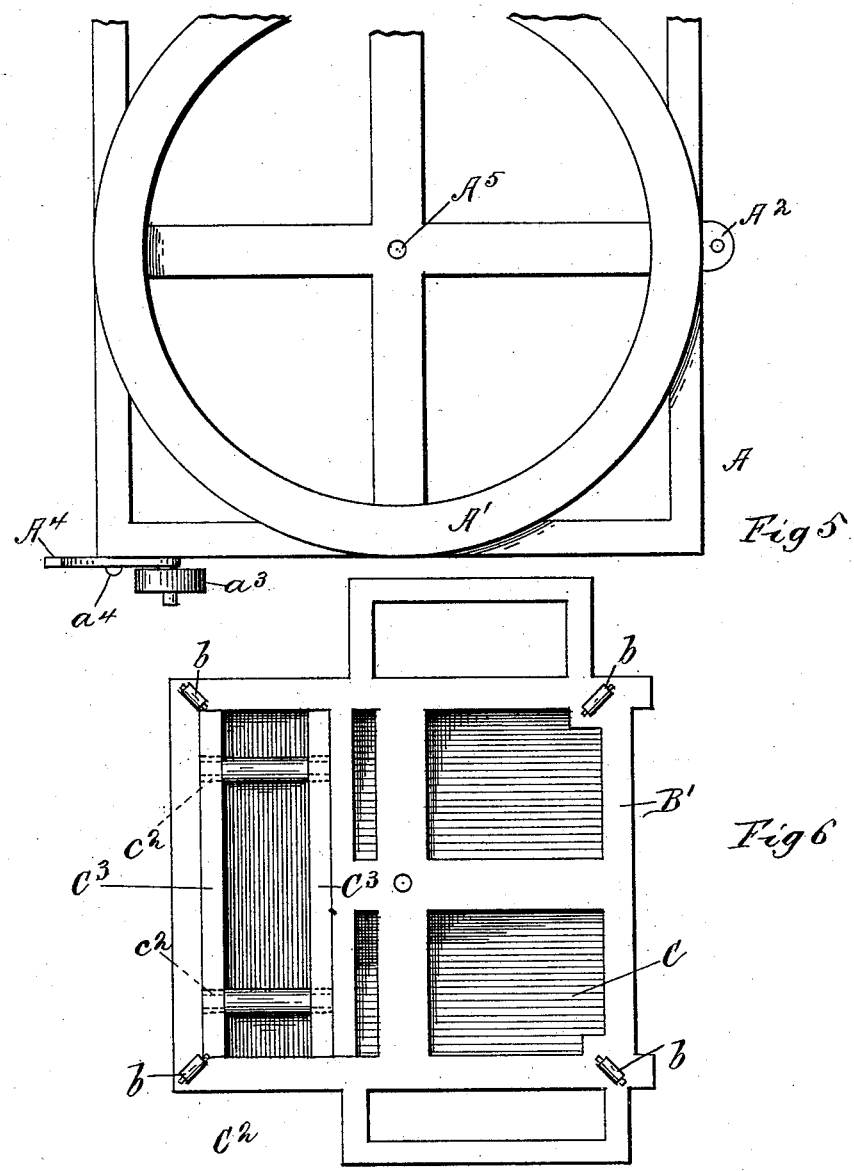

GEORGE W. L. SMITH AND JOSEPH F. DRESBACH, OF HOMER, ILLINOIS.

DUMPING APPARATUS.

SPECIFICATION forming part of Letters Patent No. 416,349, dated December 3, 1889.

Application filed October 21, 1887. Serial No. 253,036. (No model.)

*To all whom it may concern:*

Be it known that we, GEORGE W. L. SMITH and JOSEPH F. DRESBACH, citizens of the United States, residing at Homer, in the county of Champaign and State of Illinois, have invented a certain new and useful Improvement in Dumping Apparatus, which is fully set forth in the following specification, reference being had to the accompanying drawings, in which—

Figure 1 is a front elevation of an apparatus embodying our invention; Fig. 2, a plan view of the same; Fig. 3, a side elevation; Fig. 4, a sectional view taken on the line 1 1 of Fig. 2; Fig. 5, a detail view of the truck detached, and Fig. 6 a detail bottom plan view of the frame.

Like letters refer to like parts in all the figures of the drawings.

Our invention relates to dumping apparatus for elevating and discharging the contents of loaded wagons into bins or cars, and is in the nature of an improvement upon the invention set forth in Letters Patent No. 362,324, granted to us May 3, 1887.

We will now proceed to describe a construction in which we have practically carried out our invention in one form, and will then particularly point out in the claims those features which we deem to be new and desire to protect by Letters Patent.

In the drawings, A represents a truck which may be employed to support the entire apparatus, and consists of a suitable frame provided with a circular track $A'$. At its forward end this truck is supported upon wheels $a$, carried by a transverse axle $a'$, which is swiveled under the forward end of the truck by means of a pin $a^2$, passing through a plate $A^2$, which is apertured to receive the same. A tongue $A^3$ is attached to the axle $a'$ in any suitable manner to provide for the attachment of the draft-animals thereto. At its rear end the truck A is supported by means of wheels $a^3$, each mounted at the lower end of an L-shaped support $A^4$. Each support $A^4$ is pivoted at its angle, as shown at $a^4$, to the side of the truck A, and is secured by means of a suitable pin $a^5$, passing through the support and into the truck-frame. It will be seen that this construction provides for the removal of the front wheels and the turning up of the hind wheels in such manner as to allow the truck A to rest firmly upon the ground—a position which it generally occupies when the apparatus is in operation. When it is desired to transport the apparatus from one point to another, the wheels are replaced in the position shown in the drawings.

B represents the frame of the apparatus proper, which consists of a lower rectangular frame $B'$ and a similar upper frame $B^2$, supported by posts or uprights $B^3$ at the four corners. The framing B is mounted upon the truck A, this latter being provided with a center pin $A^5$, around which the said framing revolves. Rollers $b$ are provided, one at each corner of the under frame $B'$, the said rollers being arranged immediately under the four posts or uprights $B^3$, as shown in Fig. 6, and resting upon the circular track $A'$. By this means the points of support of the upper framing B are immediately under the uprights thereof, whereby sagging of the corners of the said framing is prevented and the apparatus rendered more durable.

C represents a vertically-movable platform which supports the wagon or other vehicle, and serves to lift the same. Access is had to this platform by means of inclines $C'$, so that the wagon may be driven upon the platform C previous to hoisting the same. The platform C is provided with guide-rollers $c$, which bear against the rear uprights $B^3$ and guide the platform during its ascent or descent. A shackle $c'$ (shown more particularly in Fig. 2 of the drawings) is attached to the platform C, one end of the said shackle being formed into a hook to engage with the wagon-wheel or some other part of the wagon to prevent the same from running off the platform when this latter is inclined.

$C^2$ represents a transversely-movable section of the platform C, the same being mounted upon rollers $c^2$, which travel upon ways $C^3$ underneath the platform.

In order to lock the movable section $C^2$ and hold the same stationary, I employ a hook or catch $c^3$, which consists of a lever pivoted at about its center to one of the side rails of the platform and having one of its ends extending over the movable section and adapted to engage with the same when the said end is depressed. The other end extends upward so as to be in convenient reach of the foot of the attendant, so that when it is desired to release the movable section in order to move it laterally it is only necessary to depress the said end of the catch to disengage it from the movable section. The engagement of the hook with the movable section occurs by reason of the fact that the former is provided with a pointed or sharpened end, while the latter is constructed of wood, so that the end of the hook will engage with the wood and hold the movable section stationary.

The hoisting apparatus is as follows: D represents a transverse shaft provided with a gear $d$, with which meshes a pinion $e$ on a shaft E, provided with a drum E', upon which a rope or cable $e'$ is wound. Near each end the shaft D is provided with a drum D', and the said shaft is further provided at one end with a ratchet-wheel $d'$, with which a pivoted detent-pawl $D^2$ engages. $D^3$ represents a brake-wheel mounted on the shaft D and provided with an elastic friction-band $d^2$, one end of which is connected to a pin $d^3$ on a rock-shaft $D^4$, provided with an operating-lever $d^4$. By means of the lever $d^4$ and rock-shaft $D^4$ the friction-band $d^2$ may be tightened upon the brake-wheel $D^3$ with any desired amount of pressure, to regulate the descent of the platform. Each drum D' has connected to it two ropes F and G. The rope F passes over a pulley $f$ at the top of the framing B, and is then carried down and connected to the side of the platform C, at the front thereof. The rope G passes over a pulley $g$ at the top of the framing B, and is then carried down and connected to the side of the platform C, at the rear end thereof. In connection with each rope G, I employ a pivoted arm G', provided with a wheel $g'$, which bears upon the rope at a point intermediate between the pulley $g$ and an idle-pulley $g^2$, arranged above the drum D'. The construction and arrangement of these hoisting ropes and pulleys is of course the same on each side of the apparatus. H represents a spout, which receives the contents of the wagon and guides the same during its discharge into the bin or car. This spout is suspended at its inner end by means of a link $h$ from the top of the framing B, the suspension being pivotal, so that the spout may be turned in the arc of a circle around the rear end of the apparatus. The link $h$ also permits the spout to be moved in and out, in order that it may project to a greater or less extent, as desired, and this swinging movement is controlled by means of a rod H', connected to the spout at one end and having its outer end passing through a loop or staple $h'$ on the framing B. $H^2$ represents a bail the ends of which are pivoted to the spout H, the said bail being provided at its top with a grooved roller $h^2$, which travels upon a semicircular track $H^3$, attached to the top of the framing B, at the rear thereof. $H^4$ represents a semicircular track or way upon which the attendant may stand to operate the spout H, access being had to the same by means of a flight of steps $H^5$ at the side of the framing B.

The apparatus thus organized operates in the following manner: When the parts are in the position shown in Figs. 1, 2, and 3, the apparatus is in condition for transportation to any point where its use is desired. After transportation the front wheels of the truck are detached and the rear wheels turned up in the manner hereinbefore described, when the bottom of the truck will rest upon the ground, in the manner shown in Fig. 4. The inclines C' being then placed in position, the wagon to be unloaded may be driven directly upon the platform C, when the shackle $c'$ will be hooked into one of the rear wheels or some other convenient portion of the wagon and the team will be detached. When in position upon the platform, the rear wheels of the wagon rest upon the transversely-movable section $C^2$ thereof. The team, having been detached from the wagon, is hitched to the cable $e'$, and by hauling upon the same the shaft D, with the drums D', is caused to revolve, and the platform is thus lifted to the desired height by means of the ropes F and G. The ropes F lift the front end of the platform first, so as to give it the necessary inclination, the ropes G not beginning to lift the rear end of the platform until the slack thereof, which is held down by the pivoted arms G', is taken up. It will thus be seen that the platform is first inclined and then lifted bodily. The detent-pawl $D^2$, by its engagement with the ratchet-wheel $d'$, prevents the drums from turning backward and thus allowing the platform to descend. When the wagon has been raised to the desired position, the spout H is so turned as to receive the contents thereof and discharge the same into the bin or car, as the case may be. In case the wagon is not in a position to properly discharge its contents in the spout, its rear end may be moved laterally by means of the transversely-movable section $C^2$, upon which the rear wheels rest, so as to bring the same into proper relative position with the spout. After the contents of the wagon have been discharged the platform may be lowered by disengaging the detent-pawl $D^2$ from the ratchet-wheel $d'$ and regulating the descent of the platform by means of the friction-band.

It is obvious that various modifications in the details of construction may be made without departing from the principles of our invention. For instance, the truck A may be dispensed with and the running-gear attached directly to the bottom of the framing B.

Various other modifications will readily suggest themselves, and we therefore do not wish to be understood as limiting ourselves strictly to the precise details hereinbefore described and shown in the drawings.

Having thus described our invention, what we claim as new, and desire to secure by Letters Patent, is—

1. In a dumping apparatus, the combination, with the truck mounted on suitable carrying-wheels and provided with a center pin and a circular track, of the hoisting-frame provided with a suitable hoisting-platform vertically movable therein, said frame being pivoted on the center pin and having corner uprights, and being provided with rollers arranged at the corners under said uprights to rest upon the track, substantially as and for the purposes specified.

2. The combination, with the truck A and the revoluble framing mounted thereon and provided with a vertically-movable hoisting-platform, of the detachable front wheels and the rear wheels carried by pivoted supports, whereby the truck may be lowered to rest upon the ground, and the inclines C', adapted to be placed at the ends of the truck when thus lowered, substantially as and for the purposes specified.

3. In a dumping apparatus, the hoisting-platform adapted to receive a wagon or other similar vehicle, said platform being provided with a laterally-movable section upon which the rear wheels of the said vehicle may rest, substantially as and for the purposes specified.

4. In a dumping apparatus, the combination, with the hoisting-platform C, of the laterally-movable section $C^2$, provided with the rollers $c^2$, the ways $C^3$ for said rollers, and the catch $c^3$, substantially as and for the purposes specified.

5. In a dumping apparatus, the combination, with the hoisting-platform C, of the shaft D, provided with the drums D', the ropes F and G, connected to said drums and to the front and rear ends of the platform, respectively, and the pivoted arms G', having rollers $g'$ to take up the slack of the ropes G, substantially as and for the purposes specified.

6. The combination, with the framing B, of the spout H, pivoted to a swinging link $h$, suspended from said framing, and provided with the pivoted bail $H^2$, having roller $h^2$, and the track $H^3$ for said roller, substantially as and for the purposes specified.

GEORGE W. L. SMITH.
JOSEPH F. DRESBACH.

Witnesses:
EPHRAIM DRESBACH,
W. L. ANDERSON.